United States Patent [19]

Prantl et al.

[11] Patent Number: 5,319,052
[45] Date of Patent: Jun. 7, 1994

[54] PRINTING INKS CONTAINING OXIDATIVELY CROSSLINKABLE URETHANE RESINS

[75] Inventors: Bernhard Prantl, Worms; Dirk Lawrenz, Maxdorf; Rolf Walz, Rutesheim, all of Fed. Rep. of Germany

[73] Assignee: BASF Lacke+ Farben Aktiensellschaft, Munster, Fed. Rep. of Germany

[21] Appl. No.: 677,929

[22] Filed: Apr. 1, 1991

[30] Foreign Application Priority Data

Apr. 7, 1990 [DE] Fed. Rep. of Germany ....... 4011376

[51] Int. Cl.$^5$ ..................... C09D 11/06; C08G 63/48
[52] U.S. Cl. ......................... 528/48; 528/75; 528/80; 528/84; 528/85; 525/55; 525/301; 525/308; 525/309; 525/455; 106/27 R; 106/32
[58] Field of Search ........... 528/48, 75, 80, 84, 528/85; 525/55, 301, 308, 309, 455; 106/27, 32

[56] References Cited

U.S. PATENT DOCUMENTS 3,778,395 12/1973 Huelsman et al. .
4,116,902 9/1978 Harris et al. .
4,985,490 1/1991 Rosthauser et al. .................. 528/48
5,004,779 4/1991 Blum et al. ........................... 524/591

FOREIGN PATENT DOCUMENTS 0017199 10/1980 European Pat. Off. .
0140323 5/1985 European Pat. Off. .
0379007 7/1990 European Pat. Off. .

OTHER PUBLICATIONS

The Printing Ink Manual, Fourth Edition 184–186, 202–203, 341.

*Primary Examiner*—John Kight, III
*Assistant Examiner*—John M. Cooney, Jr.
*Attorney, Agent, or Firm*—Keil & Weinkauf

[57] ABSTRACT

Oxidatively crosslinking essentially isocyanate-free urethane resins, obtainable by reacting
A) 100 parts by weight of an ester of
($a_1$) an aliphatic $C_3$–$C_8$-alcohol having three or more hydroxyl groups and
($a_2$) an unsaturated $C_8$–$C_{40}$-fatty acid and
($a_3$) if required, an aliphatic or aromatic polycarboxylic acid of 4 to 20 carbon atoms or an anhydride thereof, in amounts of up to 60% by weight, based on the fatty acid $a_2$), the ester containing sufficient free hydroxyl groups to correspond to an OH number of 50–150 mg of KOH/g, with
B)
($b_1$) 3–120 parts by weight of $C_5$–$C_{15}$-polyhydroxycarboxylic acids having two or more hydroxyl groups and
($b_2$) 10–100 parts by weight of an aliphatic or cycloaliphatic polyisocyanate or a mixture thereof, at 50°–150° C. in the presence of a nonpolar solvent which is inert to isocyanates, are suitable for use as printing ink components.

4 Claims, No Drawings

PRINTING INKS CONTAINING OXIDATIVELY CROSSLINKABLE URETHANE RESINS

The present invention relates to oxidatively crosslinkable essentially isocyanate-free urethane resins, obtainable by reacting A) 100 parts by weight of an ester of
- ($a_1$) an aliphatic $C_3$–$C_8$-alcohol having three or more hydroxyl groups and
- ($a_2$) an unsaturated $C_8$–$C_{40}$-fatty acid and
- ($a_3$) if required, an aliphatic or aromatic polycarboxylic acid of 4 to 20 carbon atoms or an anhydride thereof, in amounts of up to 60% by weight, based on the fatty acid $a_2$), with B)
- ($b_1$) 3–120 parts by weight of a $C_5$–$C_{15}$-polyhydroxycarboxylic acid having two or more hydroxyl groups and
- ($b_2$) 10–100 parts by weight of an aliphatic or cycloaliphatic polyisocyanate or a mixture thereof, at 50°–150° C. in the presence of a nonpolar solvent which is inert to isocyanates.

The present invention furthermore relates to processes for the preparation of these resins, their use as binders for printing inks and printing inks containing these binders.

It is generally known that resins or oils which are crosslinked by atmospheric oxygen can be used in the formulation of printing inks, in order to improve the mechanical and chemical resistance of prints.

Linseed oil, which contains polyunsaturated fatty acids and is therefore one of the oxidatively drying oils, has long been used in printing inks.

Urethane oils based on linseed oil can also be used for this purpose, the mono- or diglycerides of unsaturated fatty acids being reacted with diisocyanates.

Drying alkyd resins can also be used as oxidatively crosslinkable components. Such polyester resins modified with unsaturated fatty acids can be prepared, for example, from linseed oil, glycerol and phthalic anhydride (cf. Printing Ink Manual, pages 184–186 and 202–203, 4th edition, London, 1988).

EP-A-0 017 199 discloses oxidatively curable resins which are obtained by reacting a urethane prepolymer of diisocyanates and dihydroxyalkanecarboxylic acids with an intermediate obtained from a polyol and unsaturated fatty acids.

However, the oils and resins known to date are unsatisfactory when used as drying components in printing inks based on mineral oil, such as those which are suitable for line gravure printing.

Such printing inks must in fact simultaneously meet the following requirements:
solubility in mineral oil
good dispersibility in water or aqueous alkalis, so that excess ink can be removed rapidly and reliably from the printing cylinder
good resistance to alkalis after curing.

Systems known to date meet only some of these requirements.

Another problem is that printing inks tend to form a skin, which gives rise to difficulties in many printing applications, for example because the ink partially dries in the inking unit when the printing press has been shut down for a long time. There is therefore a need for printing inks which show a substantial retardation of skin formation compared with conventional printing inks but dry rapidly and thoroughly on the printed material (i.e. the Skinnex effect).

This effect can be achieved by adding anti-oxidants, such as volatile oximes, phenol derivatives or quinones (cf. Printing Ink Manual, 4th edition, page 341). However, the disadvantages of these known processes is that the use of phenol derivatives can lead to yellowing and quinones have an adverse effect on drying on the printed material. The use of oximes therefore involves problems because, owing to their volatility, they frequently do not reach their place of action at all.

It is an object of the present invention to provide resins which have drying properties and simultaneously meet the requirements with regard to solubility in mineral oil on the one hand and water dispersibility on the other hand.

We have found that this object is achieved by the oxidatively crosslinkable urethane resins defined at the outset and the processes, defined thereby, for their preparation, and their use in printing inks and printing inks containing these resins.

Component A

Suitable components A are esters of ($a_1$) an aliphatic alcohol having three or more hydroxyl groups, ($a_2$) an unsaturated $C_8$–$C_{40}$-fatty acid and ($a_3$) if required, an aliphatic or aromatic polycarboxylic acid, which esters contain sufficient free hydroxyl groups to correspond to an OH number of 50–150 mg of KOH/g.

Examples of suitable aliphatic $C_3$–$C_8$-alcohols having three or more hydroxyl groups are glycerol, trimethylolpropane, pentaerythritol, dipentaerythritol, sorbitol and mixtures thereof, pentaerythritol being preferred.

Suitable components ($a_2$) are monounsaturated or polyunsaturated $C_8$–$C_{40}$-fatty acids, for example lineolic acid, elaeostearic acid or, preferably, lindenic acid or dehydrated castor acid.

If higher molecular weights are desired, aliphatic or aromatic polycarboxylic acids of 4 to 20 carbon atoms or anhydrides thereof can be used for chain extension. Examples of suitable compounds ($a_3$) are phthalic acid, isophthalic acid, terephthalic acid, tetrahydrophthalic acid, maleic acid, fumaric acid, adipic acid and maleic anhydride.

The amount of ($a_3$) can be such that it corresponds to up to 60, preferably 10–30, % by weight of the amount of component ($a_2$) (=100% by weight).

Instead of pure fatty acids ($a_2$), it is also possible to use natural oils which contain corresponding unsaturated fatty acids in the form of their glycerol esters. Examples of suitable oils are perilla oil, soybean oil, safflower oil, oiticica oil or, preferably, linseed oil or dehydrated castor oil, the amount corresponding to the content of fatty glycerides.

The amount of aliphatic alcohol ($a_1$) is then chosen, taking into account the glycerol content of the natural fatty ester, so that the resulting ester A still contains sufficient free hydroxyl groups to correspond to an OH number of 50–150 mg of KOH/g.

The ester A is prepared by a conventional process at 150°–270° C. The reaction can be carried out in the presence of acidic esterification catalysts, for example p-toluenesulfonic acid. The resulting water of reaction can be removed from the reaction mixture by conventional methods, via a water separator.

The ester component A, which has an OH number of 50–150 mg of KOH/g, is then modified according to B).

Reaction product B

Suitable components (b$_1$) are C$_5$-C$_{15}$-hydroxyalkanecarboxylic acids having two or more hydroxyl groups. 2,2-Di-(hydroxymethyl)-carboxylic acids, such as 2,2-dihydroxymethylbutyric acid and 2,2-di-(hydroxymethyl)propionic acid, are particularly suitable.

The amount of (b$_1$) is 3–120 parts by weight, based on 100 parts by weight of ester A.

Suitable components (b$_2$) are aliphatic di- or polyisocyanates of 4–25 carbon atoms or mixtures thereof, preferably hexamethylene diisocyanate, 4,4'-diisocyanatodicyclohexylmethane or isophorone diisocyanate.

The amount of (b$_2$) is 10–100 parts by weight per 100 parts by weight of (A).

The compounds (b$_1$) and (b$_2$) are reacted with component A at 50°–150° C., preferably 60°–90° C., and atmospheric pressure or pressures up to 10 bar may be employed. In order to reduce the viscosity of the reaction mixture, the reaction is carried out in the presence of nonpolar organic solvents which are inert to the isocyanate groups. Examples of suitable solvents are mineral oils which boil within a range from 100° to 350° C. and may either contain aromatics or be free of aromatics.

The reaction is usually carried out until all hydroxyl groups which are reactive to isocyanates under these conditions have reacted. Where the isocyanate component is used in amounts such that there is an excess, based on reactive hydroxyl groups, residual isocyanate groups are deactivated by adding a C$_1$-C$_{18}$-monoalcohol. Suitable monoalcohols include monoester or monoether alcohols, for example diethylene glycol monoethyl ether. It is also possible to allow the residual isocyanate groups to react with hydroxypivalic acid. Usually, a one-fold to five-fold excess of alcohol component is added. Deactivation of the isocyanate groups can be carried out at 20°–150° C.

The isocyanate content can be determined by methods known to the skilled worker, via the isocyanate number, and in specific cases the amount of monoalcohol required can be found by simple experiments.

In a preferred embodiment, some or all of the acid groups of component (b$_1$) are neutralized with tertiary C$_3$-C$_{24}$-amines or tertiary C$_3$-C$_{24}$-aminoalcohols, and the amine may also be added in excess. Suitable tertiary amines are trimethylamine, triethylamine, dimethylethylamine, dimethylisopropylamine, tripentylamine and tri-2-ethylhexylamine.

Examples of suitable tertiary C$_3$-C$_{24}$-aminoalcohols are triethanolamine, butyldiethanolamine, dimethylneopentanolamines, dimethylaminobutanol, dimethylaminohexanol, dimethylaminodiglycol and diethylamino-1,2-propanediol.

All reactions are usually carried out by a batchwise procedure, but it also possible to employ a continuous procedure, for example in a stirred kettle cascade.

The novel oxidatively crosslinkable urethane resins are very useful as drying components for printing inks based on mineral oil and at the same time reduce the undesirable skin formation without adversely affecting rapid thorough drying on the printed material.

Because of the good solubility in mineral oil, it is possible to prepare offset, intaglio and letterpress printing inks.

Such printing inks may also contain drying agents, for example cobalt salts or manganese salts, for accelerating autoxidation.

Resins which meet the requirements for solubility in mineral oil, water dispersibility and resistance to alkalis, for example acidic resins based on rosin, as described in German Patent Application P 38 31 242.5, can be used as further binders. Such acidic rosins can be obtained by reacting maleated rosin with resols and subsequently modifying the product with aminoalcohols and unsaturated fatty acids.

The pigments used are the conventional pigments, such as those which are suitable for printing inks based on mineral oil.

Suitable mineral oils are, for example, aliphatic and/or aromatic hydrocarbons boiling within a range from 150° to 300° C.

The printing inks may furthermore contain fillers and conventional additives.

Moreover, the novel resins can be used in screen printing inks and in conventional gravure and flexographic printing inks. Because of the good dispersibility, they can also be employed in aqueous printing inks.

Preparation of the novel resins

EXAMPLE 1

2,520 g of dehydrated castor acid were mixed with 657 g of pentaerythritol, 291 g of phthalic anhydride, 473 g of xylene and 3.5 g of p-toluenesulfonic acid under a nitrogen atmosphere and were heated for 4 hours at 180° C., the resulting water of reaction being removed via a water separator. The reaction was continued at 180° C. under an acid number of 8 mg of KOH/g and an OH number of 95 mg of KOH/g was reached. 635 g of aromatics-free mineral oil boiling within a range from 240° to 270° C., 100 g of dimethylolpropionic acid and 198 g of dimethylisopropylamine were added to 612 g of this reaction product, once again under a nitrogen atmosphere, and dissolved at 100° C. 240 g of isophorone diisocyanate were added dropwise to this solution at 80° C. The reaction temperature of 80° C. was maintained until all isocyanate groups had reacted. Thereafter, the reaction mixture was heated to 130° C. under reduced pressure of about 50 mbar, all readily volatile constituents being distilled off, except for the high boiling mineral oil. A clear resin solution which had a viscosity of 2,900 Pa.s at 23° C., a solids content of 60% and an acid number of 50 mg of KOH/g, based on the solid resin, was obtained.

EXAMPLE 2

2,400 g of linoleic acid were mixed with 657 g of glycerol, 474 g of terephthalic acid, 472 g of xylene and 4 g of p-toluenesulfonic acid under a nitrogen atmosphere and were heated for 3 hours at 180° C. with removal of water of reaction. This temperature was maintained until an acid number of 6 mg of KOH/g and an OH number of 105 mg of KOH/g was reached, and the solvent was distilled off under reduced pressure. Thereafter, 390 g of this product were mixed with 67 g of dimethylolpropionic acid and 100 g of N-methylpyrrolidone, and 173 g of isophorone diisocyanate and 1 g of dibutyltin dilaurate were added dropwise at 80° C. After reaction for 1 hour at 80° C., the mixture was heated at 120° C. until all isocyanate groups had reacted, after which 138 g of an aromatics-free mineral oil boiling within a range from 140° to 220° C. were added. A clear resin solution having a viscosity of 800 Pa.s at 23° C., a solids content of 45% and an acid number of 50 mg of KOH/g, based on the solid resin, was obtained.

The resin had excellent solubility in dilute aqueous alkali.

EXAMPLE 3

2,520 g of isomergic acid were mixed with 652 g of pentaerythritol, 279 g of phthalic anhydride, 3 g of tetrabutyl orthotitanate and 470 g of xylene under a nitrogen atmosphere and were heated for 4 hours at 180° C. with removal of water of reaction. The reaction was continued at 180° C. until an acid number of 8 mg of KOH/g and an OH number of 95 mg of KOH/g were reached, after which volatile constituents were distilled off under reduced pressure. 717 g of this product were mixed with 750 g of a mineral oil boiling within a range from 260° to 290° C. and with 238 g of dimethylisopropylamine, and 300 g of isophorone diisocyanate were added slowly at 80° C. After reaction for 1 hour at 80° C., the mixture was heated to 120° C. and volatile constituents were distilled off under reduced pressure. The resulting clear resin solution had a solids content of 50%, a viscosity of 1,200 Pa.s at 23° C., and an acid number of 40 mg of KOH/g, based on the solid resin.

EXAMPLE 4

57 g of dimethylolpropionic acid and 57 g of N-methylpyrrolidone were added to 374 g of the reaction product of fatty acid pentaerythritol and phthalic anhydride from Example 1, and 174 g of HMDI (4,4'-diisocyanatodicyclohexylmethane) and 1 g of dibutyltin dilaurate were added dropwise at 85° C. After reaction for 1 hour at 85° C., the temperature was increased to 120° C. and this temperature was maintained until all isocyanate groups had reacted. After the addition of 348 g of a mineral oil boiling within a range of 240° to 270° C., readily volatile constituents were distilled off from the resin solution at 120° C. under reduced pressure. The resulting resin solution had a solids content of 58% and could be readily incorporated at 50°-80° C. into a printing ink. The acid number was 37 mg of KOH/g, based on the solid resin.

EXAMPLE 5

2,520 g of dehydrated castor acid, 879 g of pentaerythritol, 805 g of phthalic anhydride, 4 g of p-toluenesulfonic acid and 450 g of xylene were mixed with one another under a nitrogen atmosphere and were heated for 3 hours at 180° C. with removal of water of reaction. The reaction was continued at 180° C. until an acid number of 6 mg of KOH/g of reaction mixture was reached; readily volatile constituents were then distilled off at 180° C. under reduced pressure. 99 g of dimethylolpropionic acid and 75 g of dimethylaminodiglycol were added to 657 g of the resulting product and dissolution was effected at 130° C. to give a clear solution. After the addition of 94 g of an aromatics-free mineral oil boiling within a range from 160° to 210° C., 111 g of isophorone diisocyanate were slowly added at 80° C. As soon as the residual isocyanate value had reached 0.5%, 99 g of ethyleneglycol monobutyl ether and a further 120 g of mineral oil were added. The resulting clear resin solution had a solids content of 75% and a viscosity of 200 Pa.s at 23° C. The acid number of the solid resin was 46 mg of KOH/g.

COMPARATIVE EXPERIMENT A (according to European Patent 17,199, Example XI)

For this purpose, 100 g of dimethylolpropionic acid, 240 g of isophorone diisocyanate, 0.4 g of dibutyltin dilaurate and 380 g of acetone were stirred under a nitrogen atmosphere and heated to 60° C., and this temperature was maintained for a few hours in order to complete the reaction. 612 g of the product obtained from dehydrated castor oil, pentaerythritol and phthalic anhydride from Example 1 were then added to this reaction mixture at 38°-43° C. in the course of 1 hour. Thereafter, the mixture was heated to 57° C. and this temperature was maintained for a further 6 hours, 635 g of an aromatics-free mineral oil boiling within a range from 240° to 270° C. being added. Readily volatile constituents were then distilled off at 130° C. and 50 mbar.

It was not possible to obtain a clear resin solution. The resin formed was sparingly soluble in aromatics-free mineral oil.

Rosin binder for the preparation of printing inks

The preparation was carried out according to German Patent Application P 38 31 242.5, Example 2: 1,336 g of rosin were melted under a nitrogen atmosphere, and 270 g of butylphenol, 141 g of paraformaldehyde, 8 g of magnesium oxide and 150 g of butanol were added at 100° C. The reaction mixture was refluxed for 4 hours at 110° C., after which the temperature was increased to 200° C. in the course of 5 hours, readily volatile constituents being distilled off. Thereafter, 235 g of maleic anhydride were added in the course of 30 minutes and the mixture was heated at 200° C. for a further 2 hours and then cooled to 160° C. 145 g of ethanolamine were added to the reaction mixture at 160° C., the reaction mixture was kept at 160° C. for a further hour and heated to 180° C. in the course of 2 hours, after which 638 g of dehydrated castor acid were added. Heating was then carried out for a further 5 hours at 200° C., water being distilled off. The condensate having a softening point of 60° C. was obtained.

EXAMPLE 6

Printing ink for line gravure printing

A print paste which was usual for printing paper having good wet strength by the gravure printing method was prepared from 160 g of the reaction product according to Example 1,
100 g of pigment Heliogen Blue D 7030,
250 g of prepared chalk,
100 g of permanent white,
130 g of acidic rosin binder,
40 g of sodium dodecylbenzenesulfonate,
20 g of cobalt octoate,
100 g of a mineral oil boiling within a range from 160° to 290° C. and
100 g of montan wax.

The printed sheets were not tacky, so that it was not necessary to use interleaves. Excess ink could be washed away from the printing cylinder rapidly, easily and completely with 0.3–1% strength alkali.

After curing, which took about 5–6 days, the crisply clear prints proved to have excellent resistance to alkalis.

EXAMPLES 7-10

Results similar to those of Example 6 were obtained with print pastes which each contained a reaction product according to Examples 2 to 5 instead of the reaction product from Example 1.

COMPARATIVE EXPERIMENT B

A printing ink which contained a reaction product according to the Comparative Experiment instead had only moderate solubility in alkalis and could not be used for printing.

COMPARATIVE EXPERIMENT C

A print paste in which the reaction product from Examples 1 to 5 was replaced by a commercial, long-oil, drying dehydrated castor acid/phthalic acid alkyd resin dissolved only slowly and incompletely in 0.3-1% strength aqueous alkali.

Offset printing inks having the Skinnex effect

EXAMPLES 11-13

| Printing inks according to Example | 11 | 12 | 13 |
|---|---|---|---|
| Binder according to Example 1[1] [g] | 400 | 250 | 200 |
| Alkyd resin[1],[2] [g] | 200 | 150 | 200 |
| Rosin-modified phenol resin[1],[3] [g] | — | 230 | 330 |
| Pigment Heliogen Blue D 7032 [g] | 180 | 150 | 150 |
| Varnish linseed oil [g] | 200 | 200 | 100 |
| Drying agent (12% strength by weight manganese octoate in mineral oil) [g] | 20 | 20 | 20 |

[1] As 50% strength by weight solution in high boiling mineral oil
[2] Commercial alkyd resin obtained from phthalic anhydride, linseed oil and glycerol
[3] Resin as described in German Patent Application P 38312425

Offset printing inks were prepared from the above-mentioned components by conventional methods and their performance characteristics were tested. The results are shown in the Table below. Performance characteristics:

| Printing inks according to Example | 11 | 12 | 13 |
|---|---|---|---|
| Skin formation in the ink can after (days) | 2 | 2 | 1 |
| Partial drying in the inking unit of the printing press after (days) | 2 | 1 | 1 |
| Drying of the prints after one day | good | good | very good |

We claim:

1. A printing ink based on mineral oil and containing as a binder from 2 to 60% by weight, based on the total weight of the printing ink of an oxidatively crosslinkable essentially isocyanate-free urethane resin obtained by reacting
   A) 100 parts by weight of an ester of
      ($a_1$) an aliphatic $C_3$-$C_8$-alcohol having three or more hydroxyl groups and
      ($a_2$) an unsaturated $C_8$-$C_{40}$-fatty acid and
      ($a_3$) from 0 to 60% by weight, based on the fatty acid ($a_2$) and of an aliphatic or aromatic polycarboxylic acid of 4 to 20 carbon atoms or an anhydride thereof, the ester containing sufficient free hydroxyl groups to correspond to an OH number of 50-150 mg of KOH/g, with
   B)
      ($b_1$) 3-120 parts by weight of $C_5$-$C_{15}$-polyhydroxycarboxylic acids having two or more hydroxyl groups and
      ($b_2$) 10-100 parts by weight of an aliphatic or cycloaliphatic polyisocyanate or a mixture thereof,
   at 50°-150° C. in the presence of a nonpolar solvent which is inert to isocyanates.

2. A printing ink as defined in claim 1, wherein some or all of the acid groups of component ($b_1$) are neutralized with tertiary amines or tertiary amino alcohols.

3. A printing ink as defined in claim 1, wherein the mineral oil is an aliphatic or aromatic hydrocarbon boiling within a range of from 150° to 300° C.

4. A printing ink as defined in claim 1, wherein the oxidatively crosslinkable urethane resin is isocyanate-free.

* * * * *